(12) United States Patent
Dennis et al.

(10) Patent No.: US 11,846,332 B2
(45) Date of Patent: Dec. 19, 2023

(54) OPEN-ENDED, SPRING APPLIED, HYDRAULICALLY RELEASED BRAKE WITH FULL ALIGNMENT OF COMPONENTS

(71) Applicant: Ausco Products, Inc., Benton Harbor, MI (US)

(72) Inventors: Brian P. Dennis, Kalamazoo, MI (US); Howard H. Baldeosingh, Stevensville, MI (US); Peter J. Pozivilko, St. Joseph, MI (US); Kenneth A. Dodd, Dowagiac, MI (US); Nancy L Leonard, Dowagiac, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 86 days.

(21) Appl. No.: 17/683,448

(22) Filed: Mar. 1, 2022

(65) Prior Publication Data

US 2023/0279911 A1    Sep. 7, 2023

(51) Int. Cl.
| | | |
|---|---|---|
| *F16D 65/12* | (2006.01) | |
| *F16D 55/38* | (2006.01) | |
| *F16D 65/18* | (2006.01) | |
| F16D 127/04 | (2012.01) | |
| F16D 121/06 | (2012.01) | |
| F16D 121/14 | (2012.01) | |

(52) U.S. Cl.
CPC ........... *F16D 55/38* (2013.01); *F16D 65/127* (2013.01); *F16D 65/186* (2013.01); *F16D 2121/06* (2013.01); *F16D 2121/14* (2013.01); *F16D 2127/04* (2013.01)

(58) Field of Classification Search
CPC .......... F16D 55/38; F16D 55/40; F16D 13/12; F16D 65/127; F16D 65/186; F16D 2121/06; F16D 2121/14; F16D 2127/04
USPC .................. 188/71.1, 71.5, 73.31, 170, 171; 192/70.26–70.28
See application file for complete search history.

(56) References Cited

U.S. PATENT DOCUMENTS

| | | | |
|---|---|---|---|
| 4,245,724 A | | 1/1981 | Beck |
| 4,548,306 A | * | 10/1985 | Hartz ...................... F16D 13/52 188/72.3 |
| 4,802,564 A | * | 2/1989 | Stodt ...................... F16D 13/52 192/70.12 |

(Continued)

OTHER PUBLICATIONS

Ausco brake 79507 drawing; dated Jul. 14, 2000.

*Primary Examiner* — Christopher P Schwartz
(74) *Attorney, Agent, or Firm* — Renner, Kenner, Greive, Bobak, Taylor & Weber

(57) ABSTRACT

A spring applied, hydraulically released brake includes a housing having an open end adapted to align with a vehicle surface and an internal ring extending from an inner perimeter of the housing; a piston; a disc stack including a thicker stationary disc including a tab with a hole therethrough, the hole receiving a slotted spring pin, the slotted spring pin slidably receiving a pin spring over a portion thereof; and a spring assembly adapted to urge the piston into contact with the thicker stationary disc to establish a default position of the brake; where, in a released position of the brake, the piston is not in contact with the thicker stationary disc, and the pin spring urges the thicker stationary disc into contact with the internal ring of the housing to thereby prevent the thicker stationary disc from free floating.

18 Claims, 12 Drawing Sheets

(56) References Cited

U.S. PATENT DOCUMENTS

| | | | | |
|---|---|---|---|---|
| 5,186,284 A | * | 2/1993 | Lamela | F16D 55/36 |
| | | | | 188/170 |
| 7,735,612 B2 | | 6/2010 | Pozivilko et al. | |
| 8,500,591 B2 | * | 8/2013 | Turner | F16D 65/853 |
| | | | | 180/343 |
| 10,436,264 B2 | * | 10/2019 | Baldeosingh | F16D 55/38 |
| 2023/0042558 A1 | * | 2/2023 | Leonard | F16D 55/40 |

* cited by examiner

SECTION C-C

OPEN-ENDED, SPRING APPLIED, HYDRAULICALLY RELEASED BRAKE WITH FULL ALIGNMENT OF COMPONENTS

TECHNICAL FIELD

This invention relates to a spring applied, hydraulically released brake. More particularly, this invention relates to a spring applied, hydraulically released brake that includes full alignment of springs, torque pins, and discs.

BACKGROUND

Construction and agricultural vehicles are known to use parking brakes. Many of these parking brakes are spring applied, hydraulically released (SAHR) brakes. Many SAHR brakes include components for ensuring the brake automatically comes on in certain scenarios, such as when the vehicle is shut down, when commanded by the operator, when commanded by a program from a computer processor (e.g. when a door is opened), and/or if the vehicle hydraulic system happens to fail. This generally creates an automatic parking brake. Moreover, in off-highway equipment, the primary brakes, steering, and often times drive functions all require a functioning hydraulic system. If the hydraulic system happens to fail, a dangerous situation can result. With a drop in hydraulic pressure, steering and primary brakes can become inoperable. But with SAHR brakes defaulting to a braking condition, this allows for an automatic emergency stop to safely shut down the vehicle. Since SAHR brakes default to the "on" position, there is a need to provide the ability to release the brake if the hydraulic system is inoperable, such that the vehicle can be towed.

Screw mechanisms have been utilized for this purpose. For example, U.S. Pat. No. 4,245,724 discloses a spring-engaged, pressure fluid-disengaged, parking brake that includes an annular piston movable towards and away from the brake discs for engaging and disengaging the brake. The brake housing includes an aperture coaxial with the brake shaft and the piston carries a tapped bore in alignment with the aperture in the housing. A bolt may be threaded into the bore through the aperture and rotated to draw the piston towards the aperture to disengage the brake in the absence of pressure fluid.

U.S. Pat. No. 10,436,264 discloses a brake including a piston housing one or more springs therein. The one or more springs urge an extension of the piston into contact with a disc stack in a default position of the brake. The brake includes a manual release feature. The manual release feature generally includes a threaded article inserted into a threaded bore in the piston.

Brakes can generally be fully enclosed, with enclosures on both ends, and open ended, without an enclosure at one of the ends. For example, a brake can be left open ended on a transmission side. As one example, U.S. Pat. No. 7,735,612 discloses an open-ended brake. In Patent '612, rotatable discs are provided with a radially inner surface which is splined to engage the matching splines of a drive shaft. However, these rotatable discs and their mating stationary discs, sometimes known as disc stack, are loose, unaligned parts that must be assembled one at a time during brake assembly to the vehicle, costing time and money.

In another conventional open-ended brake, the brake assembles to a gearbox and a coupler shaft is used to align the discs. Though, this conventional open-ended brake has loose springs on the end of the brake, requiring the springs to be manually assembled, which can be time consuming. It also generally requires use of an expensive coupler shaft to slide over the transmission shaft.

In the design of some SAHR brakes, it is sometimes necessary to include at least one plate in the disc stack that is thicker and heavier than the other discs in the disc stack. For example, U.S. Pat. No. 4,245,724 discloses a brake employing a pressure plate 54 utilized in connection with discs 50 and 52. In a phenomenon described in more detail herein below, this design can create a drag problem when the brake is freewheeling. Even with these certain inherent disadvantages when employing a heavy disc on the top of the disc stack, this design is desirable in certain instances. Though, it remains desirable to prevent free-floating of the heavy disc.

DISCLOSURE OF THE INVENTION

It is thus an object of one aspect of the present invention to provide an open-ended, spring applied, hydraulically released (SAHR) brake that includes full alignment of the springs, torque pins, and discs.

It is an object of a further aspect of the present invention to provide a brake, as above, where the installation method does not require further manual alignment of the springs, torque pins, and discs, and does not require use of an additional coupler shaft.

It is an object of another aspect of the present invention to provide a brake, as above, that prevents free-floating of a thicker top disc and that prevents the thicker top disc from impinging on the rest of the disc stack.

These and other objects of the present invention, as well as the advantages thereof over existing prior art forms, which will become apparent from the description to follow, are accomplished by the improvements hereinafter described and claimed.

In general, a spring applied, hydraulically released brake made in accordance with the present invention includes a housing having an open end adapted to align with a vehicle surface and an internal ring extending from an inner perimeter of the housing; a piston; a disc stack including a plurality of stationary discs, a plurality of rotating discs, and a thicker stationary disc relative to the plurality of stationary discs, where the plurality of rotating discs are interspersed with the plurality of stationary discs and the thicker stationary disc, the thicker stationary disc including a tab with a hole therethrough, the hole receiving a slotted spring pin, the slotted spring pin slidably receiving a pin spring over a portion thereof; and a spring assembly adapted to urge the piston into contact with the thicker stationary disc of the disc stack to establish a default position of the brake; where, in a released position of the brake, the piston is not in contact with the thicker stationary disc, and the pin spring urges the thicker stationary disc into contact with the internal ring of the housing to thereby prevent the thicker stationary disc from free floating.

In accordance with another aspect of the invention, a spring applied, hydraulically released brake includes a housing having an open end adapted to align with a vehicle surface, an internal ring extending from an inner perimeter of the housing, and two torque pin holes within the internal ring; a piston; a disc stack including a plurality of stationary discs, a plurality of rotating discs, and a thicker stationary disc relative to the plurality of stationary discs, where the plurality of rotating discs are interspersed with the plurality of stationary discs and the thicker stationary disc; and a spring assembly adapted to urge the piston into contact with the disc stack to establish a default position of the brake; and two torque pins with respective first ends thereof being held by a respective one of the two torque pin holes, the two torque pins having a respective shaft ring slidably mounted thereon, each of the shaft rings including an annular support having teeth extending from an inside diameter thereof, the teeth being bent in a direction corresponding to the slidably mounted direction.

A preferred exemplary brake according to the concepts of the present invention is shown by way of example in the accompanying drawings without attempting to show all the various forms and modifications in which the invention might be embodied, the invention being measured by the appended claims and not by the details of the specification.

DETAILED DESCRIPTION

One or more embodiments of the present invention relate to a spring applied, hydraulically released (SAHR) brake. As will be further discussed below, the spring applied, hydraulically released brake includes full alignment of springs, torque pins, and discs. Advantageously, this full alignment of components allows for installation without requiring further manual alignment of the springs, torque pins, and discs, and moreover does not require an additional coupler shaft. In addition, the SAHR brake includes a thicker top disc, yet the SAHR brake prevents free-floating of the thicker top disc. Moreover, the brake design prevents the thicker top disc from impinging on a remainder of a disc stack. The SAHR brake also includes a mechanical release.

The SAHR brake may be particularly useful when employed on an agricultural tractor and may attach to the transmission thereof.

Figure 9:
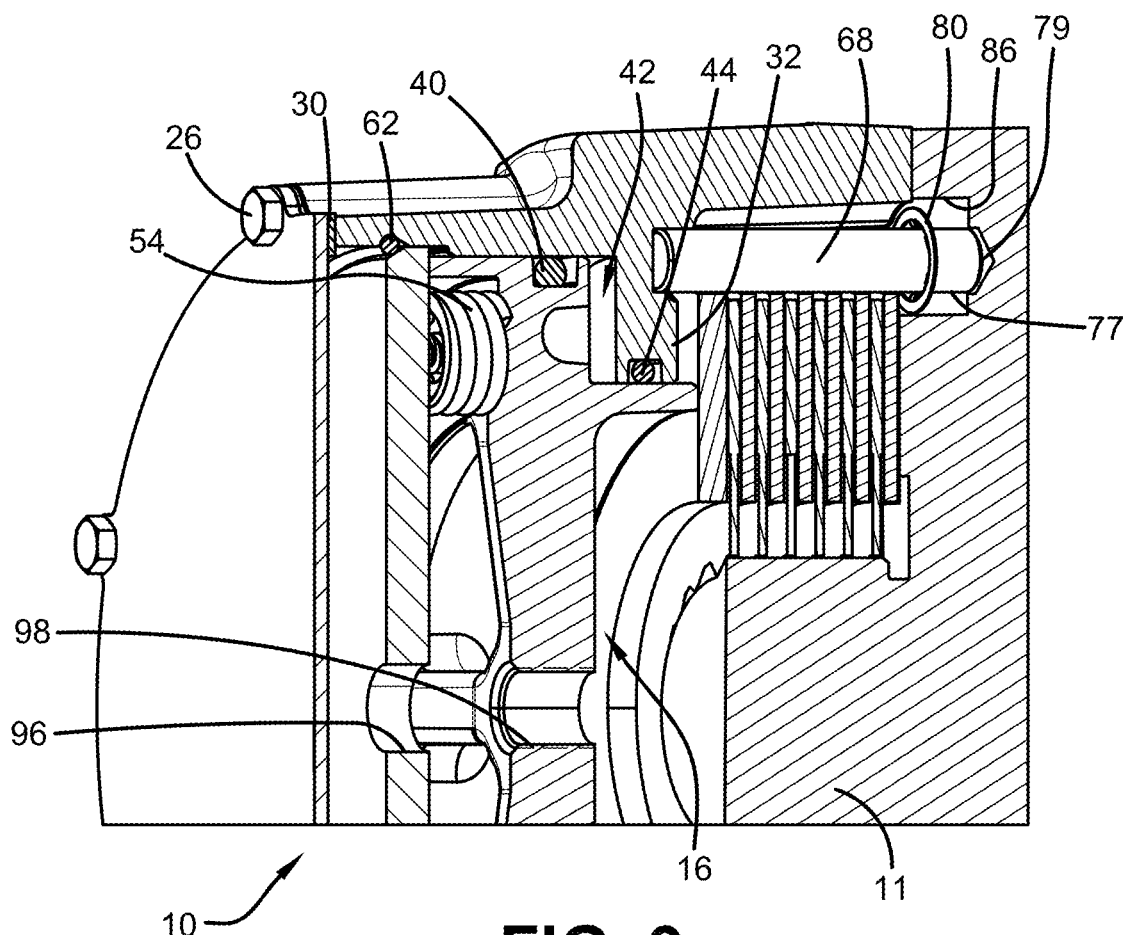
FIG. 9 is a perspective, sectional view of components of the brake of FIG. 1, showing the brake secured with a vehicle component.

With reference to the Figures, a spring applied, hydraulically released brake according to the concepts of the present invention is generally indicated by the numeral 10. SAHR brake 10, which may also be referred to as brake 10, disc brake 10, or multi-disc brake 10, includes a housing, generally indicated by the numeral 12, which carries and protects components of brake 10 and locates brake 10 in operative relation to one or more other vehicle components 11 (FIG. 9). Vehicle component 11 can be a driveline enclosure, such as an axle or a transmission enclosure, or another suitable component of a vehicle. Housing 12 includes an internal piston and braking assembly 14, which includes a piston 16, a spring assembly 18, and a disc stack 20. In a 'default' position, spring assembly 18 causes piston 16 to engage disc stack 20 to thereby enact a braking function. To overcome the braking function, hydraulic pressure is applied to urge piston 16 toward and against spring assembly 18 to thereby compress spring assembly 18 to release brake 10 for a free-wheeling operation.

Figure 1:
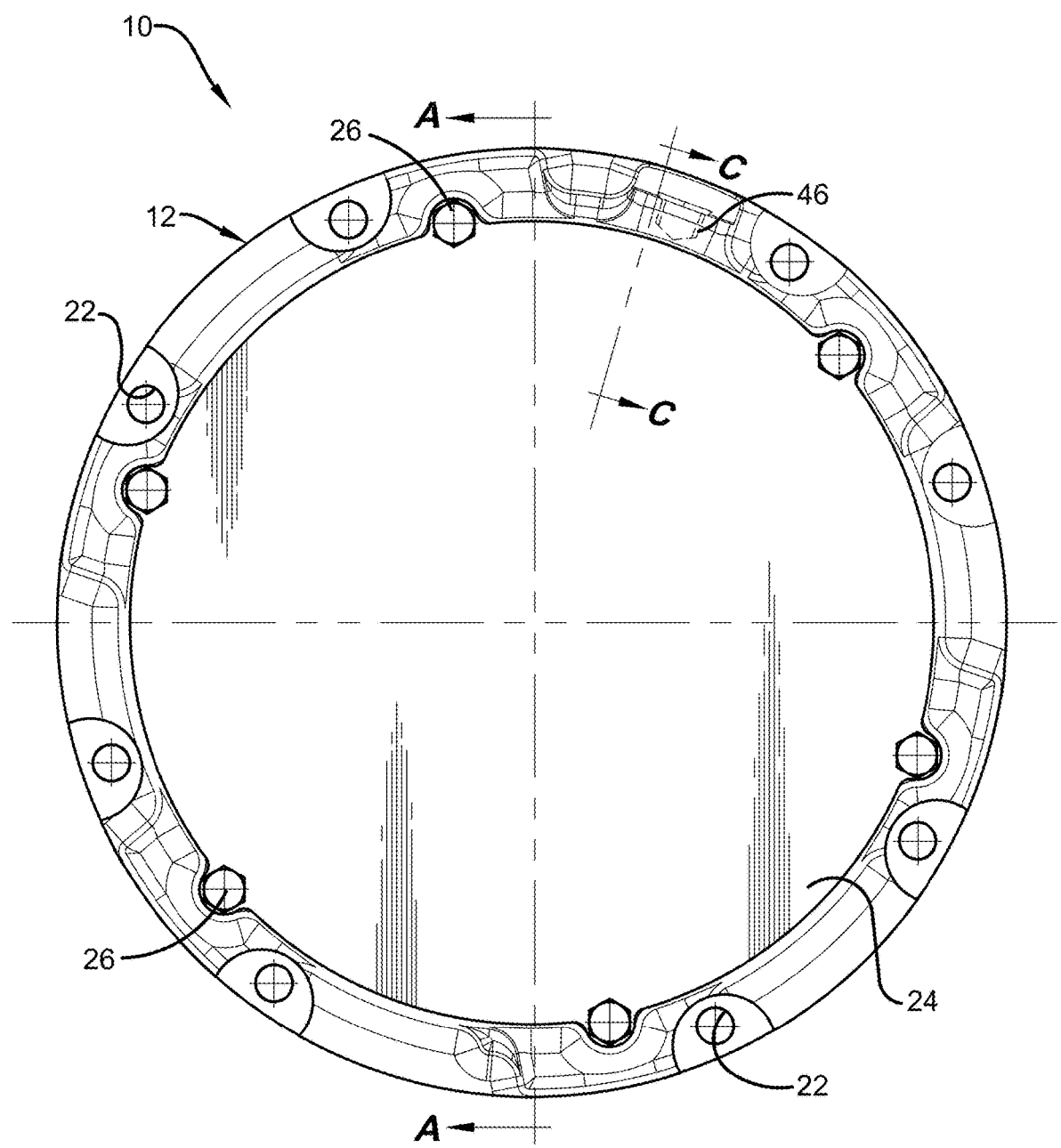
FIG. 1 is a front elevational view of a brake according to one or more embodiments of the present invention.
Figure 2:
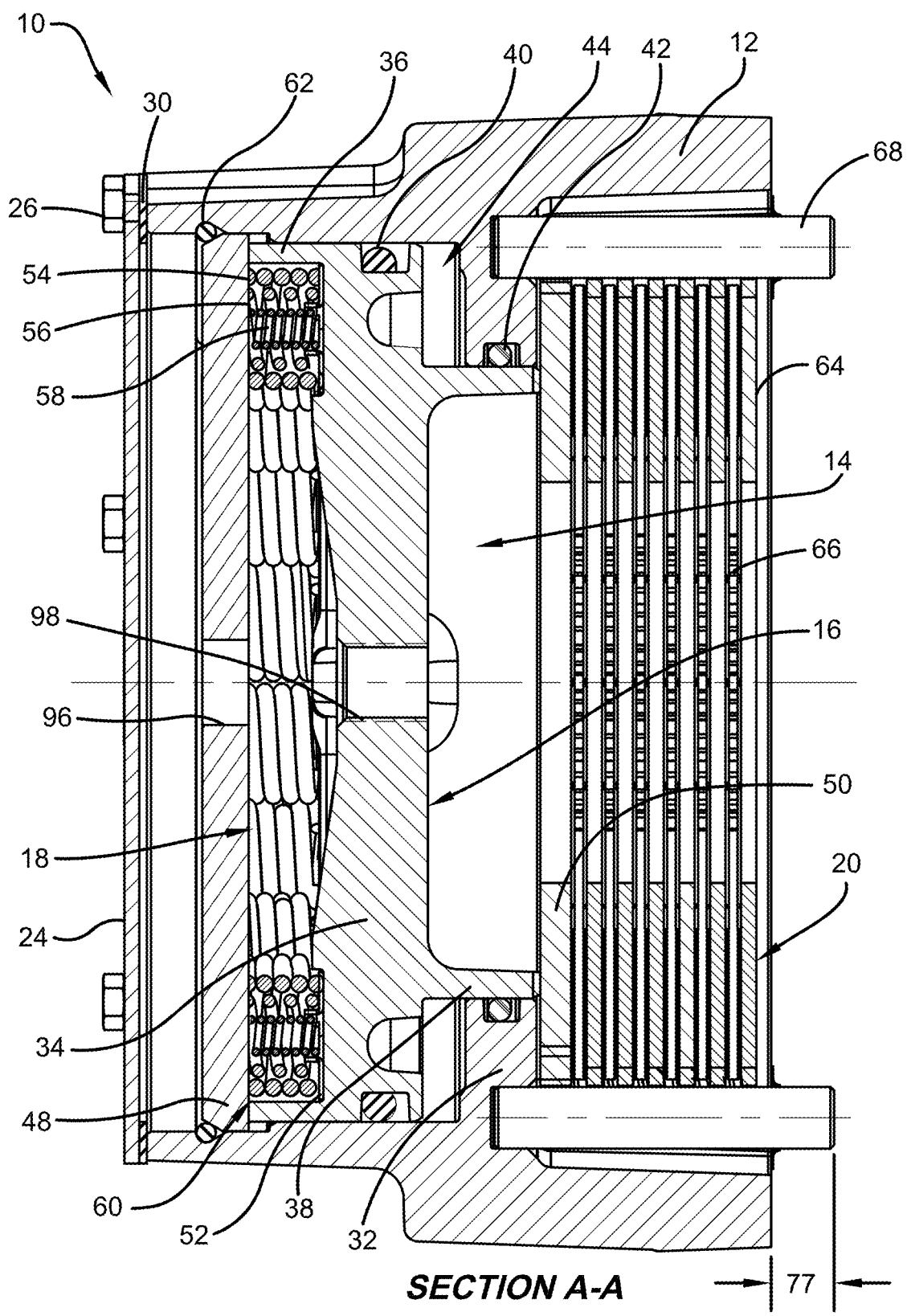
FIG. 2 is a sectional view taken substantially along line A-A of FIG. 1.

Housing 12, which may also be referred to as power plate 12 or enclosure 12, may be formed from a single unitary piece that can be secured in respective position relative to other components of a vehicle using one or more fasteners (not shown) placed in one or more fastener holes 22. In the specific embodiment shown in the Figures, eight fastener holes 22 are included in housing 12 for receiving eight corresponding fasteners, though other suitable numbers may be utilized. As mentioned above, in one or more embodiments, housing 12 is adapted to be secured to the transmission enclosure 11 of a vehicle by way of placing fasteners through fastener holes 22. This may include the use of an optional suitable mounting adapter (not shown). As shown in FIG. 2 and FIG. 9, a side (shown as the right-hand side in FIG. 2) of housing 12 is flat in order to correspond with a respective flat surface of the transmission enclosure of the vehicle. A suitable sealant (not shown), such as one or more of a gasket, an O-ring, and a liquid sealant, may be used between housing 12 and vehicle component 11.

The other side of housing (shown as the left-hand side in FIG. 2) of housing 12 is also flat in order to correspond with a flat surface of a cover plate 24 of brake 10. Cover plate 24 is secured to this side of the power plate 12, such as by way of one or more fasteners 26, which can be bolts 26, inserted into fastener holes 28 (FIG. 4), which can be threaded holes 28. Cover plate 24 generally serves to protect the internal components of brake 10 from water, dirt, and other contamination that could otherwise damage brake 10. A gasket 30 can be positioned between cover plate 24 and power plate 12 to provide further reliable sealing against external contaminants.

In the operative configuration, since power plate 12 is only enclosed on one side by way of cover plate 24, brake 10 may be described as an open-ended brake 10. That is, brake 10 does not include an enclosure at one of the sides (shown as the right-hand side in FIG. 2), which may be referred to as an open end. As mentioned above, brake 10 is open ended on a vehicle side (e.g. transmission side) such that the open-ended side aligns with a respective surface of component 11 of the vehicle (e.g. transmission surface) when brake 10 is in an installed configuration. The open-ended nature of brake 10 generally serves to provide a smaller overall product, compared to a brake otherwise having enclosures on both ends (i.e. a fully enclosed brake). This aspect also serves to reduce the length of the storage package and can reduce cost.

Figure 4:
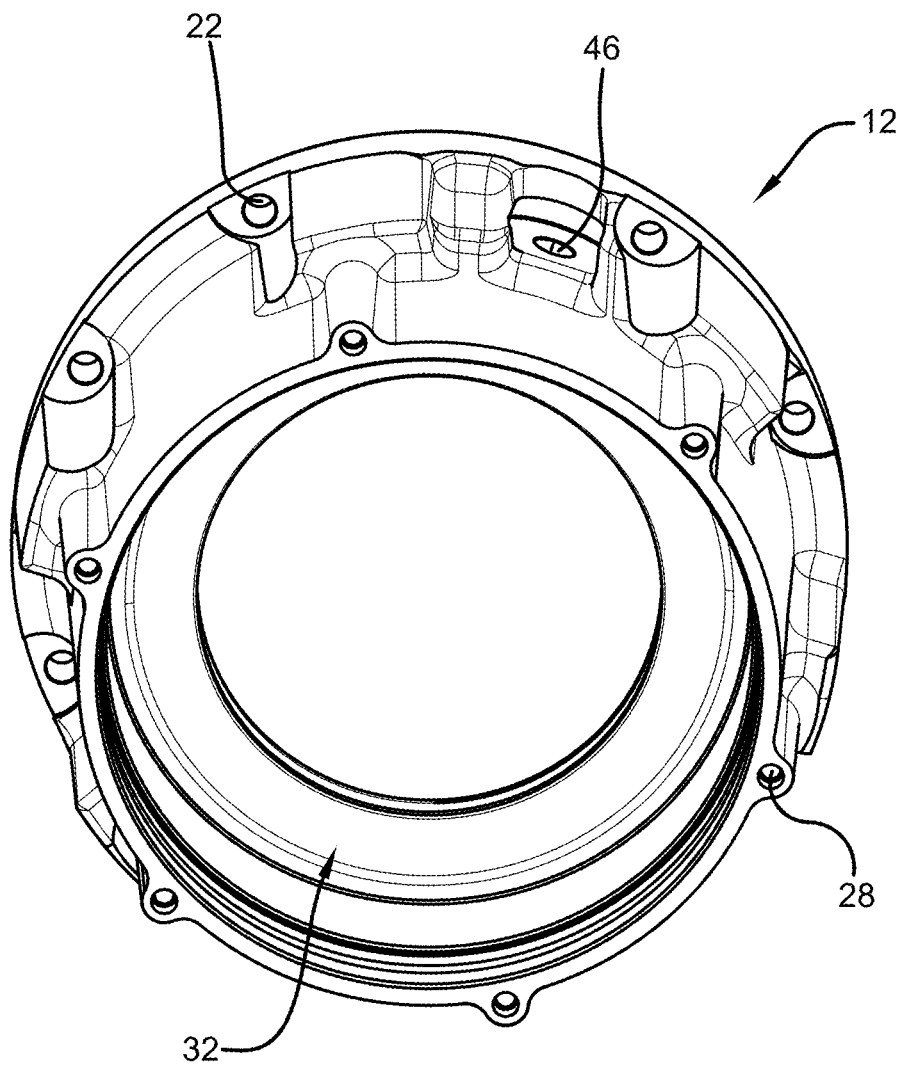
FIG. 4 is a perspective view of a power plate housing of the brake of FIG. 1.
Figure 5:
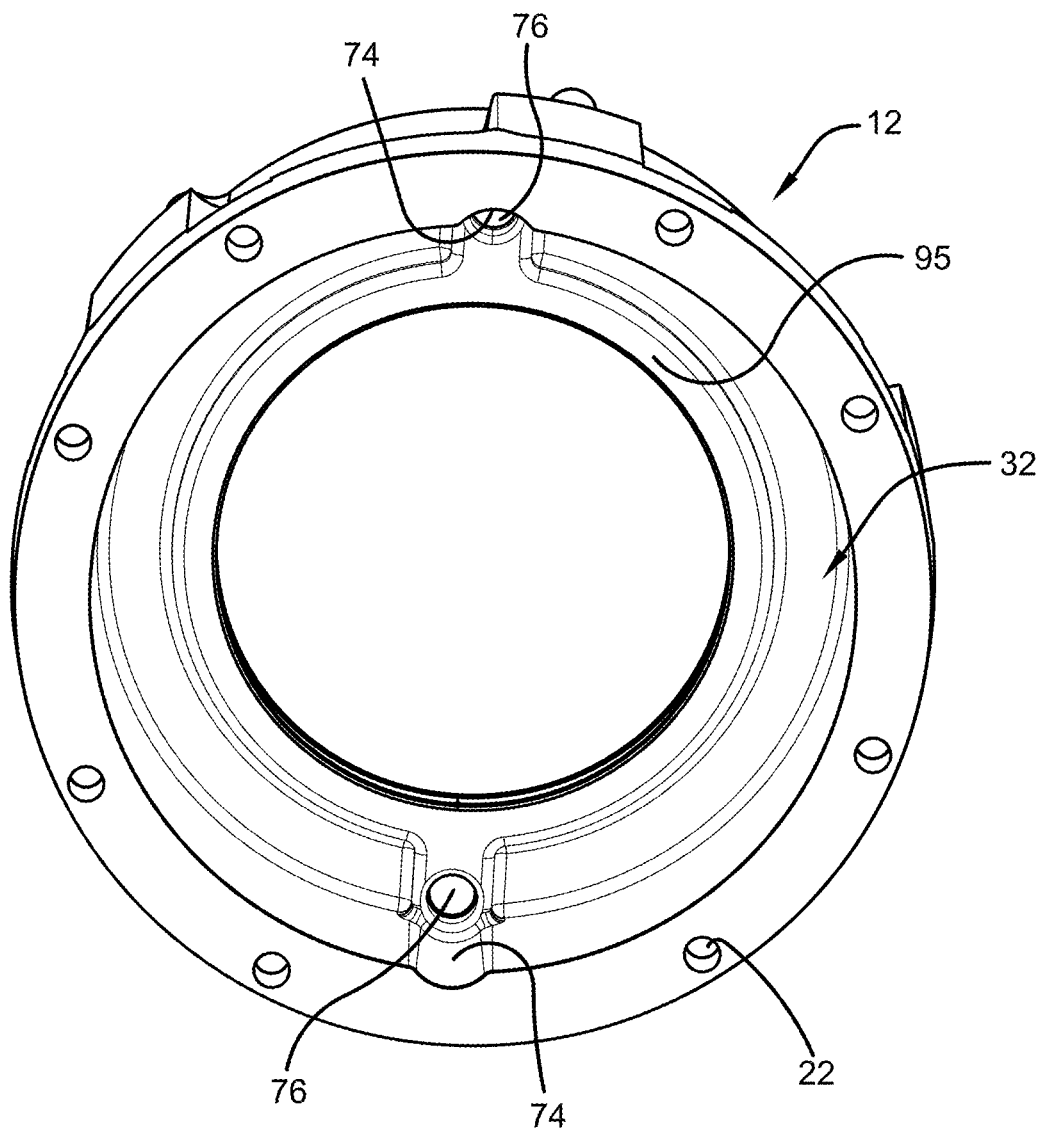
FIG. 5 is a rear perspective view of the power plate housing of FIG. 4.
Figure 6:
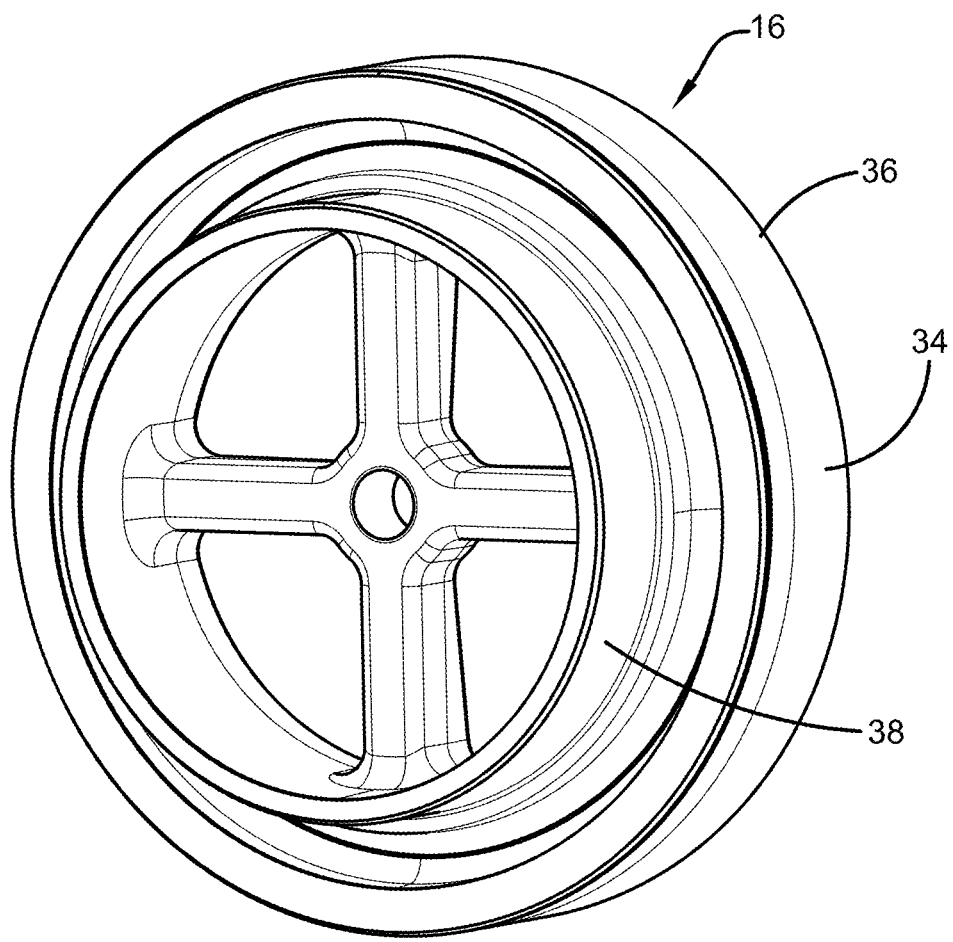
FIG. 6 is a perspective view of a piston of the brake of FIG. 1.

As shown in FIGS. 2, 4, and 5, power plate 12 includes an internal ring 32. Internal ring 32 generally serves to assist in positioning other components of brake 10, as will be further described herein. Internal ring 32 extends from an inner perimeter of the power plate 12 at a location near the center of power plate 12.

As best seen in FIG. 2, power plate 12 houses piston 16 therewithin. Piston 16, which may be described as a "top hat" style piston 16, is positioned within bores of power plate 12. More specifically, a main body 34 and an annular ring 36 of piston 16 are within a main bore of power plate 12, and a smaller annular ring 38 of piston 16 is within a bore of internal ring 32 of power plate 12. Piston body portion 34 includes an outer cylindrical surface that engages the chamber formed by the main housing bore (i.e., the ID and OD are complementary). The outer cylindrical surface may include a sealing ring, such as O-ring 40, to allow a small clearance between the outer cylindrical surface and the bore while still preventing fluid from leaking past this seal. Similarly, smaller annular ring 38 engages the bore of internal ring 32 and the internal ring 32 may include a sealing ring, such as O-ring 42.

As mentioned above, piston 16 is sealed by O-ring 40 and O-ring 42, and hydraulic pressure is applied in an area 44 between O-ring 40 and O-ring 42 to urge piston 16 to the left (relative to the configuration shown in FIG. 2) to compress spring assembly 18 to release brake 10 for free-wheeling operation. Hydraulic fluid area 44, which may also be referred to as a fluid chamber 44, is part of a hydraulic fluid supply network. The hydraulic fluid supply network provides pressurized fluid to fluid chamber 44 by way of a fluid port 46 (FIG. 4) within housing 12. Generally, fluid chamber 44 includes a portion of brake 10 between housing 12 and piston 16. By way of fluid chamber 44, piston 16 is in fluid communication with a source of hydraulic fluid. Upon adding hydraulic fluid to fluid chamber 44, the hydraulic fluid fluidly engages piston 16 as to apply force against spring assembly 18.

As suggested above, at one side of piston 16 is annular ring 36 and at the other side is smaller annular ring 38. Smaller annular ring 38 extends from main body 34 toward and to disc stack 20. As will be further described below relative to disc stack 20, smaller annular ring 38 directly contacts a thicker stationary disc 50 of disc stack 20.

Annular ring 36 is along the outside diameter of piston 16 and directly contacts a spring plate 48. This contact with spring plate 48 limits the stroke on piston 16 and also limits compression applied to spring assembly 18. This generally serves to prevent damage to spring assembly 18 by avoiding pushing the springs 54, 56, 58 of spring assembly 18 to a coil-on-coil position.

As best seen in FIG. 2, spring plate 48 forms a first boundary for spring assembly 18, with piston 16 generally forming a second boundary for spring assembly 18. More specifically, springs 54, 56, 58 of spring assembly 18 sit on an annular spring retainer 52 to locate springs 54, 56, 58 for assembly purposes, and an outer boundary of springs 54, 56, 58 is contained within annular ring 36 of piston 16. Said another way, springs 54, 56, 58 of spring assembly 18 are trapped between piston 16 on the right side (relative to the configuration shown in FIG. 2) and spring plate 48 on the left side (relative to the configuration shown in FIG. 2) with annular ring 36 around the outer boundary of springs 54, 56, 58.

With further reference to the springs 54, 56, 58, as seen in FIG. 2, spring 54 is an outer spring, spring 56 is a middle spring, and spring 58 is an inner spring. Each set of one outer spring 54, one middle spring 56, and one inner spring 58 may be said to form a spring sub-assembly 60. Any suitable number of spring sub-assemblies 60 can be utilized within spring assembly 18.

Turning back to the spring plate 48, spring plate 48 is held in position by a C-ring 62. Spring plate 48 includes a chamfer to interface with C-ring 62, such that axial forces from spring assembly 18 and piston 16 are redirected radially. This redirecting of forces pushes C-ring 62 into a groove within housing 12 and prevents C-ring 62 from 'walking out' under high force.

As further description of this redirection, the force of spring assembly 18 is transferred through disc stack 20 and is reacted by the vehicle component (e.g. transmission enclosure) 11 to which brake 10 is attached, since the vehicle component 11 is in contact with the other end of disc stack 20. The fastened (e.g. bolted) joint formed by power plate 12 and vehicle component 11 via fasteners (not shown) through fastener holes 22 closes the loop on these forces back to C-ring 62. In other words, spring assembly 18 pushes piston 16 into disc stack 20, which pushes on vehicle component 11. Threaded holes (not shown) in vehicle component 11 transfer that load to fasteners (not shown) holding power plate 12 to vehicle component 11, and power plate 12 transfers the load to C-ring 62, which transfers the load to spring plate 48, which is on the opposite side of spring assembly 18.

As mentioned above, in a 'default' position, spring assembly 18 causes piston 16 to engage disc stack 20 to thereby enact a braking function. That is, when the hydraulic pressure to fluid chamber 44, and therefore to piston 16, is absent, spring assembly 18 urges piston 16 into contact with disc stack 20, particularly into contact with thicker stationary disc 50 thereof, which may also be referred to as an inboard stationary disc 50.

Figure 3:
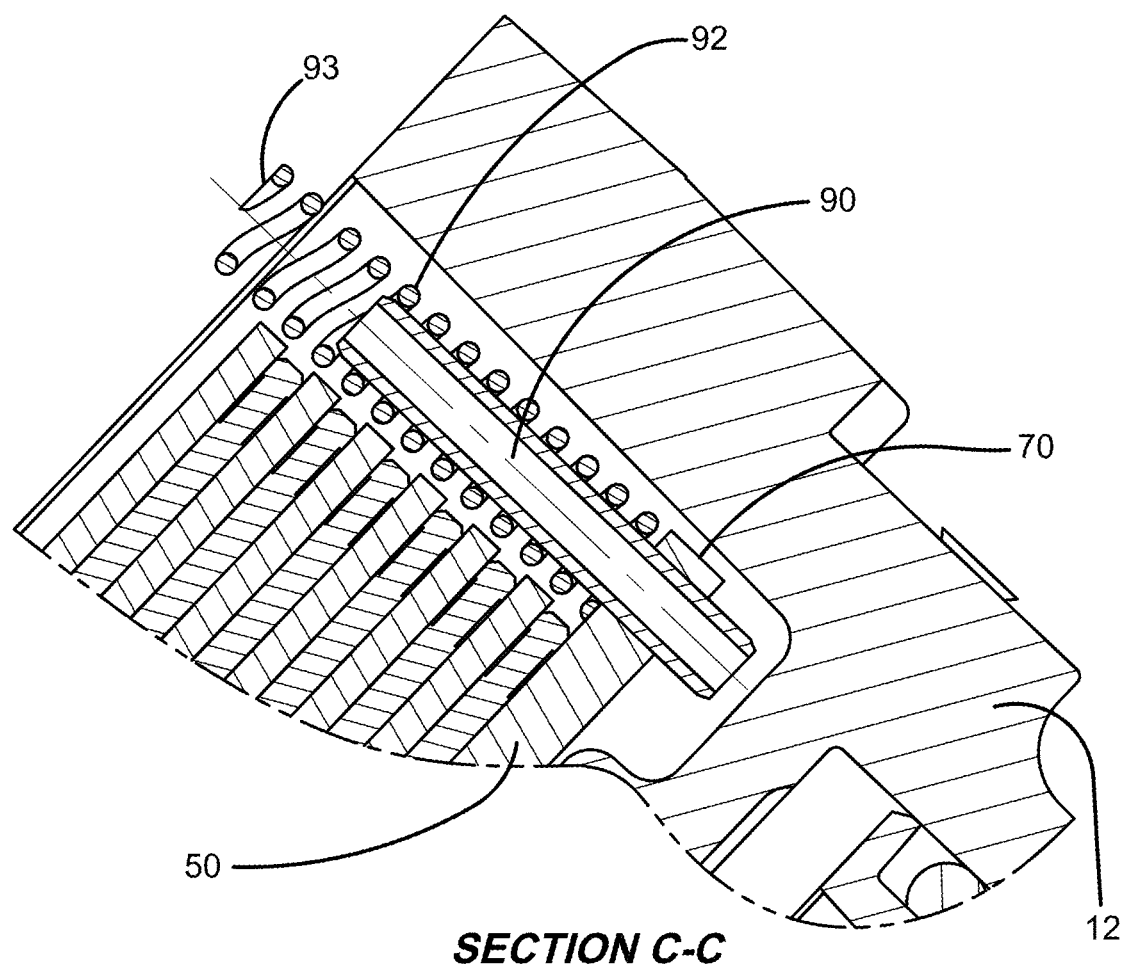
FIG. 3 is a sectional view taken substantially along line C-C of FIG. 1, showing a slotted spring pin and a compression spring.
Figure 7:
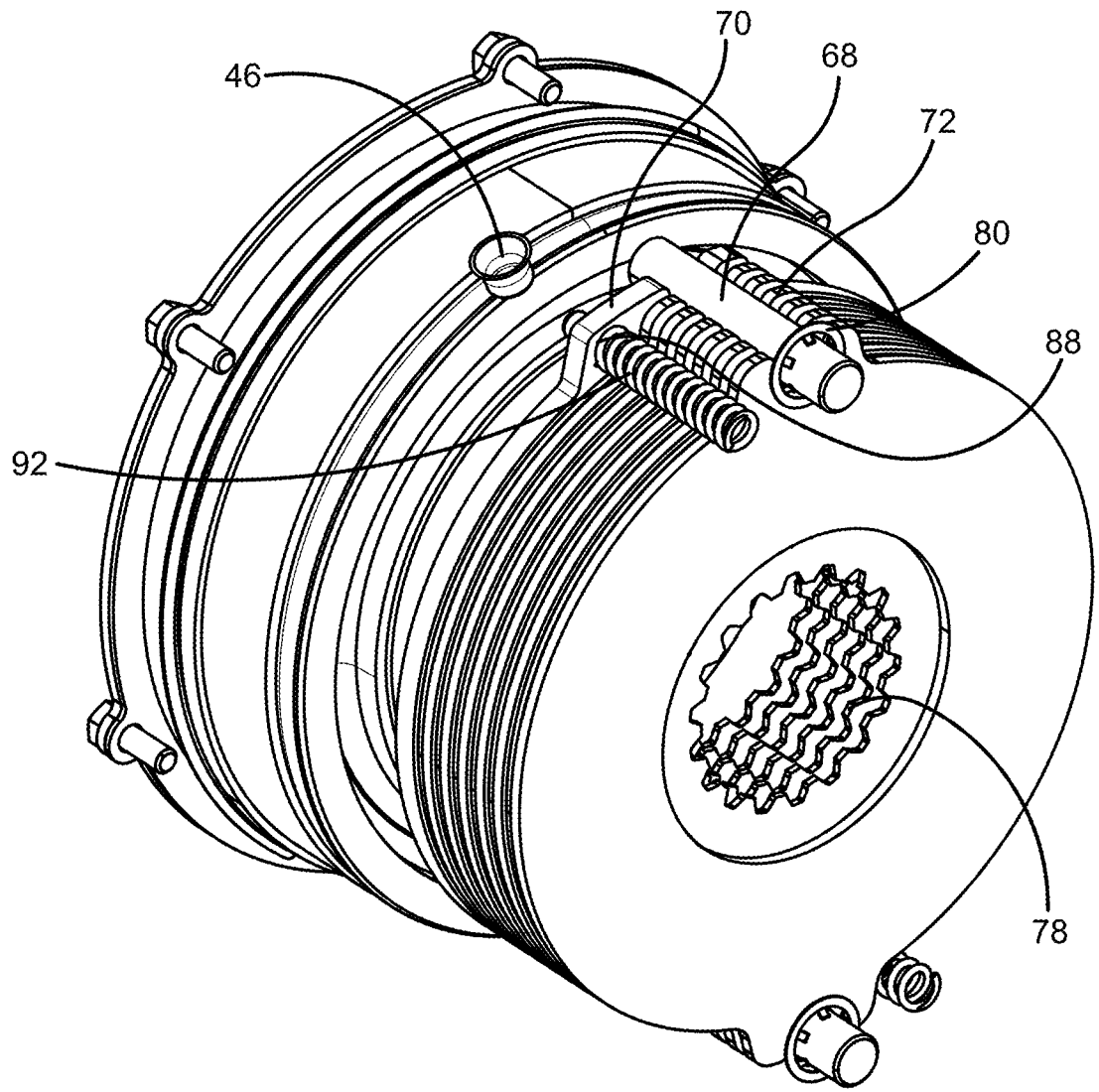
FIG. 7 is a perspective view of components of the brake of FIG. 1, shown without the power plate housing.

Disc stack 20 includes thicker stationary disc 50, as well as a plurality of stationary discs 64 and a plurality of rotating discs 66. When the spring force from spring assembly 18 is applied to disc stack 20, friction between rotating discs 66 and stationary discs 50, 64 is created that provides a torque resistance to the transmission shaft (not shown). This creates a braking effect The engaging and releasing of disc stack 20 will now be further described. Disc stack 20 is a configuration of stationary discs 50, 64 interspersed with rotating discs 66. Thicker stationary disc 50 and stationary discs 64 are slidably received axially by torque pins 68 and are thereby held from rotation with respect to brake 10. More specifically, as shown at FIGS. 3 and 7, thicker stationary disc 50 includes a tab 70 at two opposite ends for receiving torque pins 68 and stationary discs 64 include a tab 72 at two opposite ends for receiving torque pins 68. As perhaps best seen in FIG. 7, tabs 70, 72 include grooves therein for positioning torque pin 68 within the grooves. That is, the grooves of tabs 70, 72 are slid onto torque pins 68 after torque pins 68 are installed within housing 12, such as by press fitting, as will be further described herein below. Tabs 70, 72 may be generally trapezoidal, semi-circular, rectangular, semi-oval, and other suitable shapes. These suitable shapes may include rounded corners or sharp corners.

Figure 12:
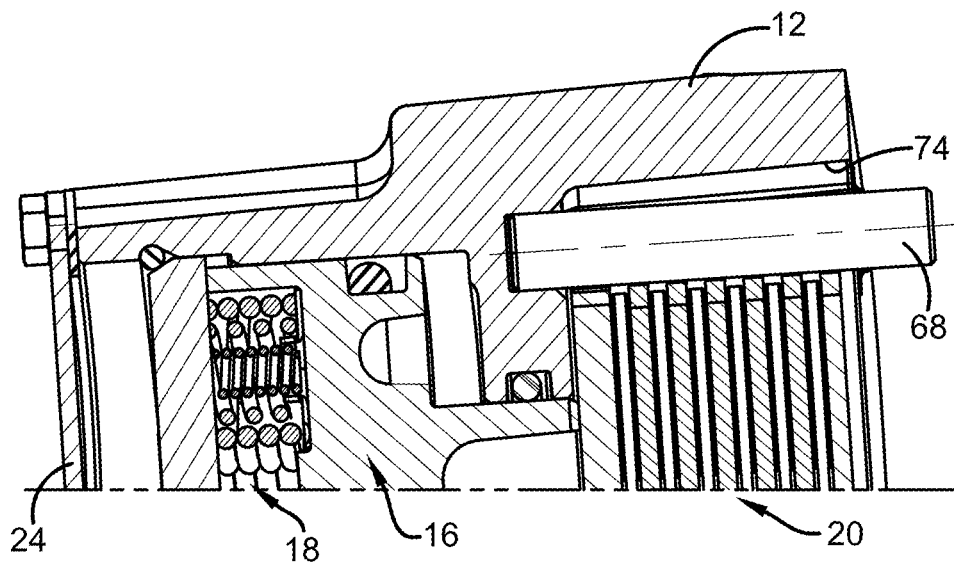
FIG. 12 is a partial sectional view of a portion of the brake of FIG. 1, showing a close-up of a torque pin and relief.
Figure 13:
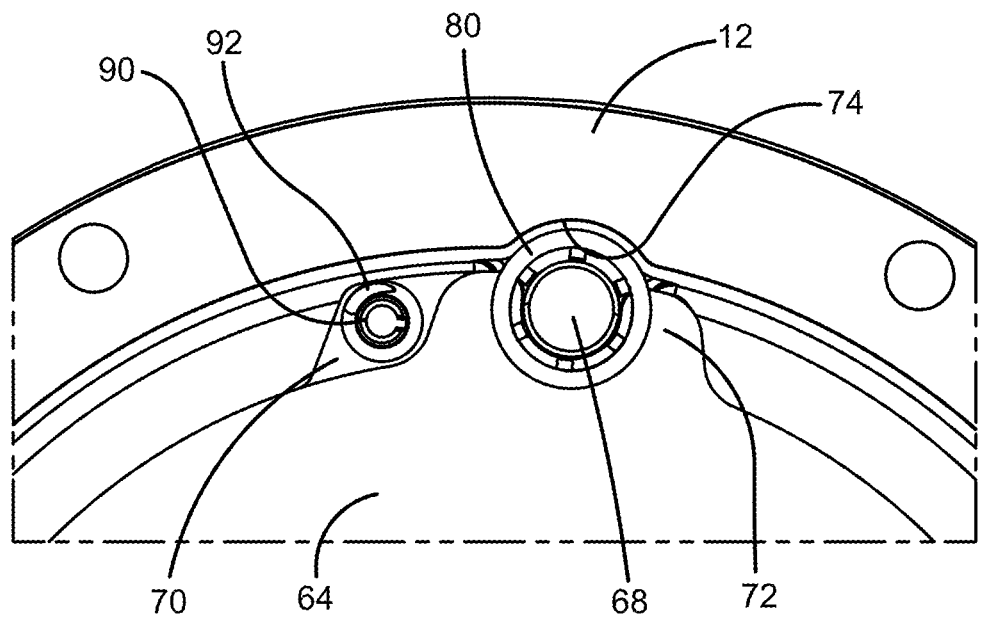
FIG. 13 is a partial rear elevational view of a portion of the brake of FIG. 1, showing a shaft ring on the torque pin and showing a slotted spring pin and corresponding spring.

As best seen in FIG. 5 and FIG. 12, the inside of housing 12 includes a relief 74 in a general position of each torque pin 68. Reliefs 74 generally serve to allow clearance for drilling and reaming, which may also be referred to as machining tool clearance, a torque pin hole 76. In one or more embodiments, reliefs 74 may include a draft angle, based on being made by a casting process. In some embodiments, without a drafted, cast relief 74, it could be required to counterbore all the way down the sidewall to create clearance for the drill and reamer, which could present disadvantages. As shown in FIG. 5, a first relief 74 may be positioned diametrically opposite, or approximate thereto, from a second relief 74. This may also be described as first relief 74 being positioned 180 degrees, or approximate thereto, from second relief 74. Other relative positions may also be suitable.

With further reference to FIG. 5, two torque pin holes 76 are formed into the internal ring 32 of housing 12. The torque pin holes 76 may be diametrically opposite relative to internal ring 32, though other positions may be suitable. Each torque pin hole 76 receives a corresponding end of one of the torque pins 68 (FIG. 7). Torque pin holes 76 are sized as to be tight fitting relative to the diameter of torque pins 68, as to allow for the torque pin 68 to be held in position in a press fit manner. Thus, when pins 68 are in torque pin holes 76, stationary discs 50, 64 are held stationary with respect to brake 10, and torque pins 68 are held stationary with respect to housing 12. It is relatively critical that torque pins 68 are strongly held in position with torque pin holes 76 by a press fit or some other strong holding mechanism. Another exemplary strong holding mechanism would be corresponding threading (not shown) on torque pin 68 and within torque pin hole 76.

As shown in FIG. 2, an overlap portion 77 of torque pins 68 extends beyond housing 12. In the assembled configuration (e.g. FIG. 9), overlap portion 77 is held in a mating hole 79 in the vehicle component 11. The torque applied by the stationary discs 50, 64 that act on the torque pins 68 is therefore grounded by the housing 12 at one end and the vehicle component 11 on the other end. That way, the pin 68 is a beam supported on both ends.

Turning back to the disc stack 20, rotating discs 66 includes a spline 78 on the inside diameter. Rotating discs 66 are attached to a central, rotating shaft (not shown) (e.g. transmission shaft) such as by a spline and groove mechanism. Said another way, the spline is slidably mounted to the rotating shaft. In one or more embodiments, a spline and groove mechanism utilizes an involute spline. Other techniques for driving rotating discs 66 utilizing a shaft may also be known to those skilled in the art.

As further description of thicker stationary disc 50, thicker stationary disc 50 serves certain advantages. If it is desired to keep the release pressure of brake 10 relatively low, a small diameter portion of piston 16 should be at or below the mean radius of the disc stack 20 in order to have sufficient area for the brake piston area. This generally means that the facing area of piston 16 in contact with disc stack 20 has to be relatively small. As such, this relatively small contact area cannot spread the force from spring assembly 18 uniformly across disc stack 20, and the force is concentrated on only a small portion of the lining area. This non-uniform lining pressure can otherwise cause a number of problems including low torque, mechanical damage to linings, and poor heat distribution. The use of the thicker stationary disc 50, which may also be referred to as top plate 50, generally resolves this problem by spreading that load out across the face of the lining, instead of concentrating force over a small area.

While the thicker stationary disc 50 serves these advantages, the thickness may also present certain challenges for the overall design of brake 10. In one way of otherwise configuring a brake disc stack with discs of essentially equal weight and size, which may be utilized for low drag in the free-wheeling condition, the discs float without springs or otherwise biasing them. That is, discs of essentially equal weight and size will normally have some incidental contact, and by Newtonian physics, they will separate themselves into their lowest energy state, so long as there is no biasing force on any of the discs. The running clearance available in the disc stack would be more or less equalized between all of the discs. In effect, the discs would bounce around to the lowest energy state and therefore the lowest drag state.

There is a different analysis when the thicker stationary disc 50, which is also relatively heavier, is placed into disc stack 20. As plates of similar weight make incidental contact with each other, they are essentially equal masses bouncing off each other. No one disc dominates, and every disc has more or less the same influence on the neighboring disc as its neighboring disc has on that disc. However, the heavier stationary disc 50 is generally indifferent to the influence of the other discs of disc stack 20. Thus, without the design of present brake 10, heavier stationary disc might impinge on the rest of the discs in disc stack 20, causing too much of the available running clearance to be located proximate to that disc.

This presents another challenge for brake 10 because the piston 16 is positioned between spring assembly 18 and the disc stack 20. In other brakes, where the piston is opposite the spring stack, the thick disc transfers the piston load to the springs. In this way, in these other brakes, piston hydraulic force pushes the thick disc down away from the stack during free-wheeling operation. The thick plate in these other brakes is not free floating and thus cannot impinge on the rest of the disc stack.

In brake 10, this configuration is not desirable, because it is alternatively desirable for spring assembly 18 to not be loose. And it also desirable for thicker stationary disc 50 to be on the top of the disc stack 20. Thus, as further described herein, brake 10 is designed as to prevent free-floating movement of thicker stationary disc 50.

It should be appreciated that when describing the thicker stationary disc the "thicker" descriptor is relative to the plurality of stationary discs 64. In one or more embodiments, thicker stationary disc 50 is about 1.5 times, in other embodiments, about 2 times, in other embodiments, about 2.5 times as thick as each of the plurality of stationary discs 64. In one or more embodiments, thicker stationary disc 50 is at least 1.5 times, in other embodiments, at least 2 times, in other embodiments, at least 2.5 times, in other embodiments, at least 3 times as thick as each of the plurality of stationary discs 64.

Figure 8:
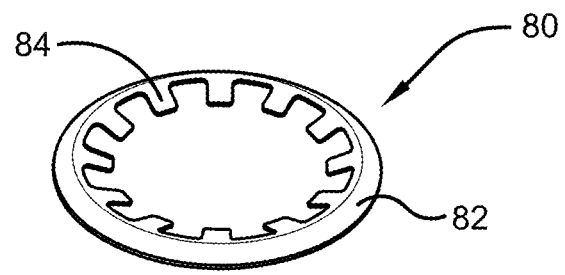
FIG. 8 is a perspective view of a shaft ring of the brake of FIG. 1.

While aspects relative to the installation of brake 10 with a vehicle component (e.g. transmission) 11 are described above, further aspects are described here. As mentioned, for brake 10 it is desirable to prevent free-floating movement of thicker stationary disc 50. As mentioned above, the ends of torque pins 68 are in torque pin holes 76, which may also be referred to as bore 76. This may be referred to as torque pins 68 being press fit into bores 76 in power plate 12. This correctly positions torque pins 76 and ensures they are not a loose part. Said another way, torque pins 68 should not move axially relative to power plate 12. Torque pins 68 slidably receive a respective shaft ring 80 (FIGS. 7-9).

Shaft ring 80 includes a generally annular support 82, which may be referred to as a base 82, with teeth 84 extending from the inside diameter of support 82. As best seen in FIG. 8, teeth 84 are bent at least partially axially in one direction relative to base 82. The inside diameter formed by the plurality of unbent teeth 84 is slightly smaller than the diameter of torque pin 68. This configuration allows shaft ring 80 to slide on easily in one direction (i.e. the direction corresponding to the bend of teeth 84) when placed over torque pin 68, since the teeth 84 will just bend out of the way. However, when shaft ring 80 is pushed in the opposite direction (i.e. the direction opposing the bend of teeth 84), the teeth 84 bite into torque pin 68 and provide substantial resistance to reverse motion of shaft ring 80. This configuration may also be referred to as an axial one-way clutch.

When the brake 10 itself is assembled, since there is not yet a vehicle component 11 present, spring assembly 18 pushes piston 16 to the bottom of the piston bore. It should be mentioned that FIG. 2 represents the fully released position of brake 10, not this state described here. The assembly configuration of brake 10 positions the top stationary disc of discs 64 at the vehicle component end above the face of power plate 12 (i.e. the right-hand end in FIG. 2). The splines 78 of rotating discs 66 are aligned by a fixture during assembly, and stationary discs 50, 64 are aligned to the torque pins 68.

Once the entire disc stack 20 is assembled, that is, once all grooves of tabs 70, 72 are slid onto the torque pins, a respective shaft ring 80 is slidably mounted on each torque pin 68. Consistent with the above description, the bent teeth 84 are directed towards the vehicle component 11, such that assembly of the shaft ring 80 by sliding action onto torque pin 68 is relatively easy. Once the shaft ring 80 contacts the top stationary disc 64, the shaft ring 80 is pushed down with top stationary disc 64 under an applied load, which serves to slightly compress disc stack 20, so that when this applied load is released, the teeth 84 of shaft ring 80 bite into torque pin 68 to lock the disc stack 20 to thereby maintain alignment thereof. Said another way, this provides some residual load to the disc stack 20 and locks the rotating discs 66 and stationary discs 50, 64 together under friction. This ensures disc stack 20 remains aligned and in position even when the brake 10 is removed from the assembly fixture for installation with vehicle component 11.

When the brake 10 is assembled onto the vehicle component 11 (e.g. transmission), the face of the vehicle component 11 presses against the top stationary disc 64. This compresses spring assembly 18 into the working position. A counterbore 86 in the face of the vehicle component 11 receives the respective shaft ring 80, so that shaft ring 80 does not interfere with proper operation of brake 10. Upon brake 10 being installed with vehicle component 11, the shaft ring 80 has served the intended function and remains in the blind hole of counterbore 86. To remove brake 10, the bolts (not shown) would be backed off, and the ring 80 would still be in place. It is not necessary to remove the ring 80 to remove the brake 10, but removing the ring 80 would be necessary to service the brake stack 20. Ring 80 is generally a single-use component.

Figure 14:
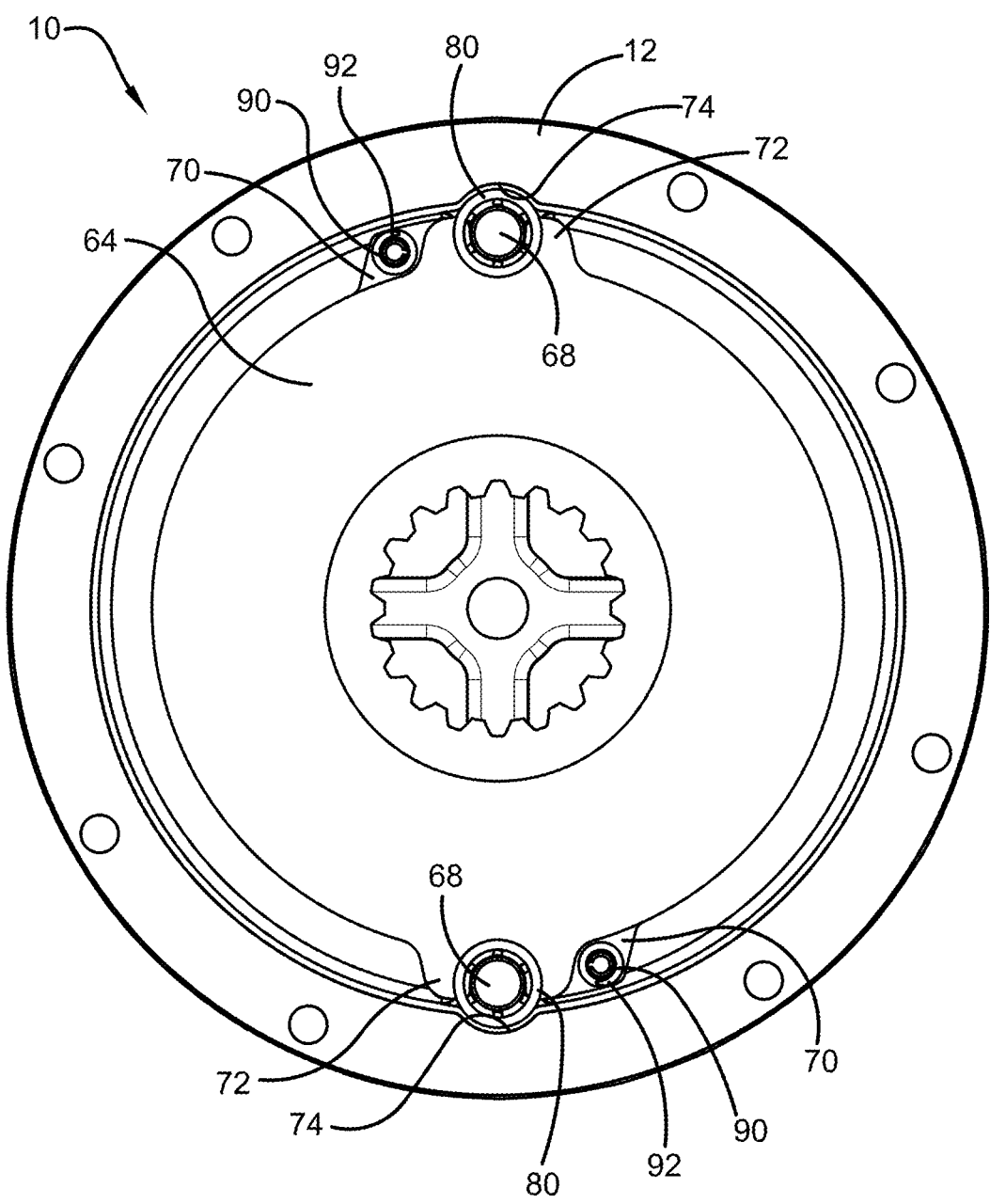
FIG. 14 is a rear elevational view of the brake of FIG. 1.
Figure 15:
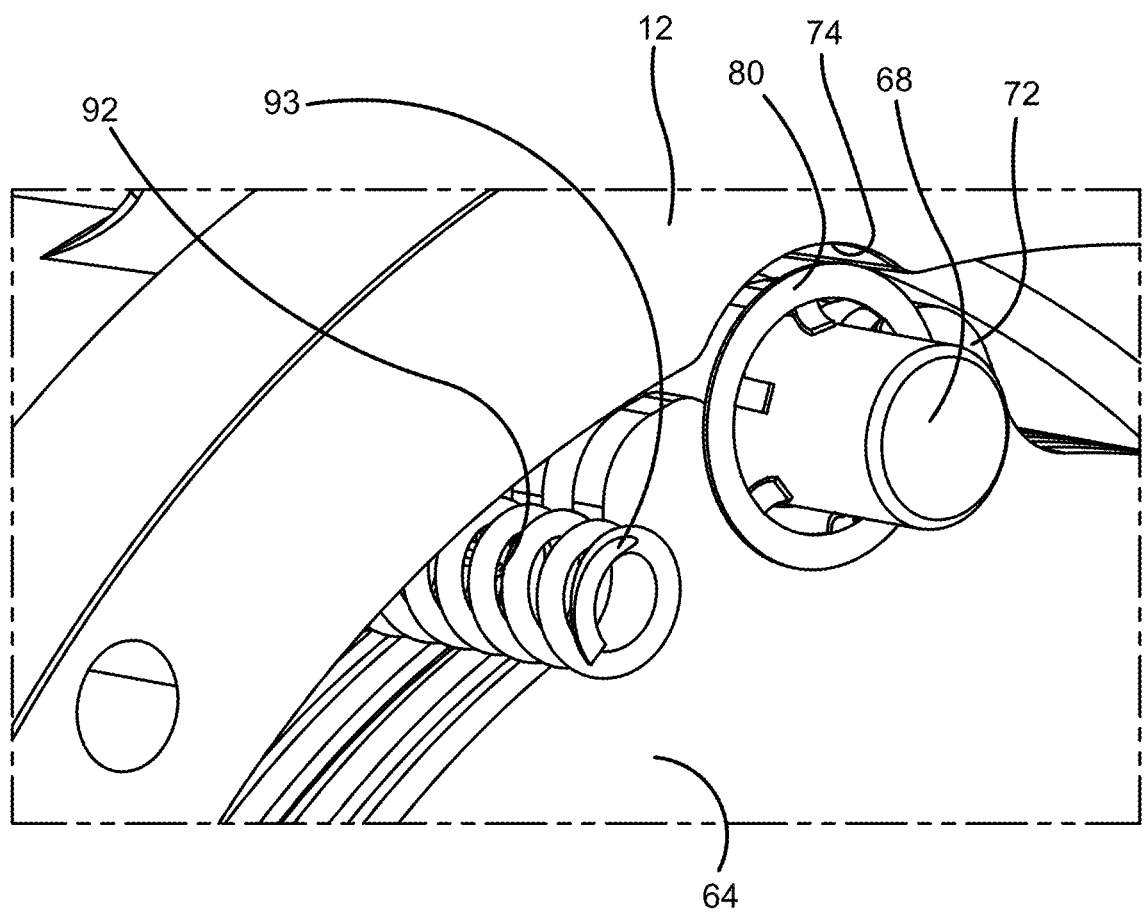
FIG. 15 is a partial perspective view of a portion of the brake of FIG. 1, showing a further close-up of components in FIG. 13.

As described above, stationary disc 50 is heavier than stationary discs 64 and rotating discs 66. Stationary disc 50 is therefore further secured within housing 12. The tab 70 of heavier stationary disc 50 has a hole 88 therein through which a slotted spring pin 90 (FIG. 3) is installed. As perhaps best seen in FIG. 14, the tab 70 on the heavier stationary disc 50 is wider than the tabs 72 on the other stationary discs 64. It is this wider portion of tab 70 that includes hole 88. As mentioned above, each tab 70 includes one hole 88, such that heavier stationary disc 50 overall includes two diametrically opposite holes 88 through which respective spring pins 90 are pressed. This installation of slotted spring pin 90 in the respective hole 88 should be a press fit, such that slotted spring pin 90 does not move once installed. Other examples include a solid pin with threading or a step pin and snap ring combination.

As shown in FIG. 3, a spring 92 is slidably received over a portion of pin 90. More specifically, spring 92 is received over the portion of pin 90 extending from stationary disc 50, and spring 92 may therefore be referred to as pin spring 92. In the uninstalled configuration, spring 92 extends beyond the face of the open end of power plate 12. Spring 92 is loose until the brake 10 is installed on transmission enclosure 11, but spring 92 is positioned on pin 90 and against stationary disc 50 during installation. With further reference to FIG. 3, prior to installation with transmission surface 11, one end 93 of the loose, free length spring 92 extends beyond the boundary of the face of power plate 12. Once assembled to the vehicle component 11, the end 93 of spring 92 would be sitting right at the interface between the vehicle component 11 and the power plate 12, with the now-compressed spring 92 being trapped between the face of the vehicle component 11 and stationary disc 50. The other end of the spring 92 moves as the stationary disc 50 moves.

When the brake 10 is released (FIG. 2) in the manner described above, spring 92 pushes stationary disc 50 into contact with power plate 12, particularly against a face 95 (FIG. 5) of inner ring 32. The spring force of spring 92 maintains this position. Said another way, as shown in FIG. 2, thicker stationary disc 50 is in contact with inner ring 32 in the released configuration of brake 10 based on force applied by spring 92. This generally serves to prevent the heavier stationary disc 50 from free floating. During braking events, force from spring assembly 18 pushing on piston 16 overcomes the force of spring assembly 16 and urges stationary disc 50 into contact with the rest of disc stack 20 and away from inner ring 32.

Brake 10 includes a manual release feature that can be used to override the regular hydraulic action of brake 10 in case the vehicle hydraulic system becomes disabled or is unable to be used. Using the manual release feature, the associated vehicle could be towed or brake 10 could be serviced without the need for the vehicle to be running.

Figure 10:
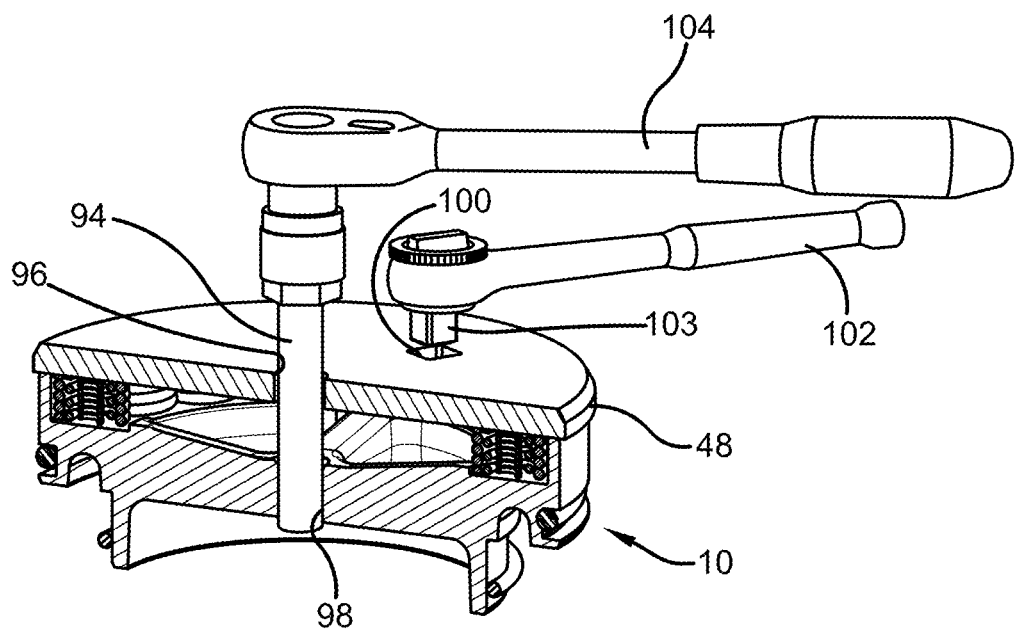
FIG. 10 is a perspective view of the brake of FIG. 1, shown in a mechanical release configuration.

FIG. 10 reflects brake 10 in the manual release position. To manually release, which may also be referred to as mechanically release, the brake 10, fasteners 26 (e.g. bolts) are removed, and cover plate 24 is removed. A threaded article 94, which may also be described as a smaller size bolt 94, is positioned through a hole 96 in the center of spring plate 48 and into a threaded hole 98 centrally located in piston 16 (see also FIG. 2). The threaded end of the smaller size bolt 94 fits within the threads of threaded hole 98. The hydraulic fluid pressure will be at zero before positioning smaller size bolt 94.

Figure 11:
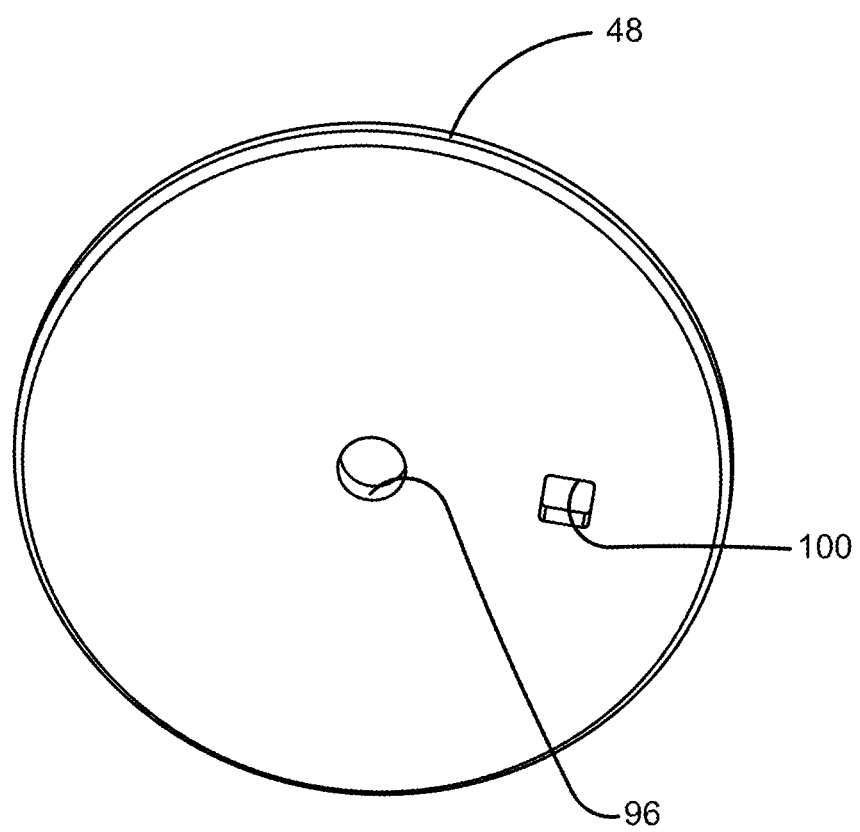
FIG. 11 is a perspective view of a spring plate of the brake of FIG. 1.

Spring plate 48 includes a square hole 100 (FIGS. 10 and 11) that is not centrally located about spring plate 48. This square hole 100 is meant to accept a ratchet 102 having a rachet head 103 corresponding to the size of square hole 100.

Upon placing smaller size bolt 94 in hole 96 and threaded hole 98, and placing the rachet head 103 of ratchet 102 in square hole 100, spring plate 48 is prevented from rotating. At the same time, a second ratchet 104 turns the bolt 94. The head of the bolt 94 reacts axially against spring plate 48 while the threaded portion of bolt 94 pulls axially on piston 16, thereby compressing spring assembly 18. This operation urges the piston 16 to the left (relative to the configuration of FIG. 2) and away from the disc stack 20, thereby releasing the brake 10 to allow for towing. Of note, friction acting on spring assembly 18 at a large diameter locks spring assembly 18 in circumferential position relative to both spring plate 48 and piston 16. Since spring plate 48 is held from rotation by rachet 102, piston 16 is also held from rotation. When towing is complete, and the brake 10 needs to be returned to service, the above-described steps are done in reverse to place brake 10 back into the operational configuration.

In one or more embodiments, brake 10 may be utilized with a hydraulic system having an available pressure of from 350 psi to 1,200 psi. In other embodiments, brake 10 may be utilized with a hydraulic system having an available maximum pressure of 3,000 psi. In one or more embodiments, the predetermined spring clamp force of spring assembly 18 is in the range of from 4,200 lbf to 5,600 lbf. The hydraulic force and spring clamp force can each be adjusted to account for vehicle size, speed, and environment.

As discussed above, brake 10 provides disc stack 20 in an aligned manner during the assembly of brake 10 and prior to installation with a vehicle component 11. This can generally serve to eliminate or reduce the cost to otherwise assemble the brake manually (e.g. discs, springs, and torque pins thereof). The preassembled brake 10, which may be referred to as a kit 10, allows the assembled brake 10 with aligned disc stack 20 to be installed (e.g. slide over a transmission shaft) with vehicle component 11, and bolted down to complete installation. This configuration of brake 10 can be contrasted with a 'loose stack' of discs, requiring discs to be assembled one at a time onto a transmission shaft, because such conventional designs lack the means to align the stack. Moreover, the present configuration of brake 10 generally does not require a coupler shaft for aligning the disc stack 20.

Brake 10 may be used on a farming tractor but could be used in any suitable vehicle. As mentioned above, brake 10 is particularly envisioned as being mounted to the transmission 11 of such a vehicle, though other suitable mounting locations are possible.

It is thus evident that a brake constructed as described herein accomplishes the objects of the present invention and otherwise substantially improves the art.

What is claimed is:

1. A spring applied, hydraulically released brake comprising
    a housing having
        an open end adapted to align with a vehicle surface and
        an internal ring extending from an inner perimeter of the housing;
    a piston;
    a disc stack including
        a plurality of stationary discs,
        a plurality of rotating discs, and
        a thicker stationary disc relative to the plurality of stationary discs,
        where the plurality of rotating discs are interspersed with the plurality of stationary discs and the thicker stationary disc,
        the thicker stationary disc including a tab with a hole therethrough, the hole receiving a slotted spring pin, the slotted spring pin slidably receiving a pin spring over a portion thereof; and
    a spring assembly adapted to urge the piston into contact with the thicker stationary disc of the disc stack to establish a default position of the brake;
    where, in a released position of the brake, the piston is not in contact with the thicker stationary disc, and the pin spring urges the thicker stationary disc into contact with the internal ring of the housing to thereby prevent the thicker stationary disc from free floating.

2. The brake of claim 1, the plurality of stationary discs including respective tabs, where the tab of the thicker stationary disc includes a wider portion wider than the tabs of the plurality of stationary discs.

3. The brake of claim 2, where the hole is in the wider portion of the tab of the thicker stationary disc.

4. The brake of claim 1, where the slotted spring pin is press fit within the hole.

5. The brake of claim 1, where the portion of the slotted spring pin slidably receiving the pin spring does not extend all the way to the open end.

6. The brake of claim 1, where the brake is mounted with the vehicle surface, where the vehicle surface is a driveline enclosure.

7. The brake of claim 6, where the driveline enclosure is either an axle or a transmission enclosure.

8. The brake of claim 1, where the thicker stationary disc is at least 1.5 times as thick as each of the plurality of stationary discs.

9. The brake of claim 1, where the tab of the thicker stationary disc is generally trapezoidal shaped with rounded corners.

10. A spring applied, hydraulically released brake comprising
    a housing having
        an open end adapted to align with a vehicle surface,
        an internal ring extending from an inner perimeter of the housing, and
        two torque pin holes within the internal ring;
    a piston;
    a disc stack including
        a plurality of stationary discs,
        a plurality of rotating discs, and
        a thicker stationary disc relative to the plurality of stationary discs,
        where the plurality of rotating discs are interspersed with the plurality of stationary discs and the thicker stationary disc; and
    a spring assembly adapted to urge the piston into contact with the disc stack to establish a default position of the brake; and
    two torque pins with respective first ends thereof being held by a respective one of the two torque pin holes, the two torque pins having a respective shaft ring slidably mounted thereon, each of the shaft rings including an annular support having teeth extending from an inside diameter thereof, the teeth being bent in a direction corresponding to the slidably mounted direction.

11. The brake of claim 10, where the shaft rings contact a top stationary disc of the plurality of stationary discs.

12. The brake of claim 11, where the shaft rings compress the disc stack under an applied load, such that when the applied load is released, the teeth bite into the respective torque pin to lock the disc stack to thereby maintain alignment of the disc stack for installation with a vehicle component.

13. The brake of claim 10, where the two torque pin holes are diametrically opposite relative to the internal ring.

14. The brake of claim 10, where the brake is mounted with the vehicle surface, where the vehicle surface is a driveline enclosure.

15. The brake of claim 14, where the driveline enclosure is either an axle or a transmission enclosure.

16. The brake of claim 10, where the thicker stationary disc is at least 1.5 times as thick as each of the plurality of stationary discs.

17. The brake of claim 10, where the respective first ends of the two torque pins are press fit within the respective one of the two torque pin holes.

18. The brake of claim 10, where the respective first ends of the two torque pins are threaded within corresponding threading of the respective one of the two torque pin holes.

\* \* \* \* \*